US011900864B2

(12) United States Patent
Hofrichter

(10) Patent No.: US 11,900,864 B2
(45) Date of Patent: Feb. 13, 2024

(54) DISPLAY WITH SENSING AND DETECTION FUNCTIONALITY

(71) Applicant: ams International AG, Jona (CH)

(72) Inventor: Jens Hofrichter, Horgen (CH)

(73) Assignee: AMS INTERNATIONAL AG, Jona (CH)

( * ) Notice: Subject to any disclaimer, the term of this patent is extended or adjusted under 35 U.S.C. 154(b) by 0 days.

(21) Appl. No.: 18/042,033

(22) PCT Filed: Aug. 6, 2021

(86) PCT No.: PCT/EP2021/072084
§ 371 (c)(1),
(2) Date: Feb. 17, 2023

(87) PCT Pub. No.: WO2022/037975
PCT Pub. Date: Feb. 24, 2022

(65) Prior Publication Data
US 2023/0316988 A1 Oct. 5, 2023

(30) Foreign Application Priority Data
Aug. 21, 2020 (EP) .................................... 20192155

(51) Int. Cl.
*G09G 3/32* (2016.01)

(52) U.S. Cl.
CPC ........... *G09G 3/32* (2013.01); *G09G 2354/00* (2013.01); *G09G 2360/144* (2013.01); *G09G 2380/08* (2013.01)

(58) Field of Classification Search
CPC ................. G09G 3/32; G09G 2354/00; G09G 2360/144; G09G 2380/08
See application file for complete search history.

(56) References Cited

U.S. PATENT DOCUMENTS

| | | | | |
|---|---|---|---|---|
| 9,318,475 | B2 * | 4/2016 | Bibl | H01L 21/6835 |
| 11,335,250 | B2 * | 5/2022 | Yin | G09G 3/32 |
| 2013/0023307 | A1 * | 1/2013 | Zimmerman | G03B 21/28 353/99 |
| 2014/0247853 | A1 | 9/2014 | Deppe | |
| 2015/0348504 | A1 | 12/2015 | Sakariya et al. | |

(Continued)

OTHER PUBLICATIONS

Extended European Search Report in corresponding European Application No. 20192155.8 dated Feb. 11, 2021, 11 pages.

(Continued)

*Primary Examiner* — Rodney Amadiz
(74) *Attorney, Agent, or Firm* — MH2 TECHNOLOGY LAW GROUP LLP

(57) ABSTRACT

A display includes a display substrate having an active display area including a plurality of first display subpixels. A transceiver circuit is arranged to drive the display in a first mode of operation or in a second mode of operation. The first display subpixels include micro light-emitting diodes and/or resonant-cavity light emitting devices. In the first mode of operation, the transceiver circuit provides a forward bias to the first display subpixels, such that the first display subpixels are operable to emit light. In the second mode of operation, the transceiver circuit provides a reverse bias to the first display subpixels, such that the first display subpixels are operable to detect light.

19 Claims, 9 Drawing Sheets

(56) References Cited

U.S. PATENT DOCUMENTS

| | | | | |
|---|---|---|---|---|
| 2017/0005235 | A1 | 1/2017 | Chou et al. | |
| 2022/0150395 | A1* | 5/2022 | Plank | G06F 1/1626 |
| 2023/0132555 | A1* | 5/2023 | Inoue | G06V 10/145 257/40 |

OTHER PUBLICATIONS

Harke, Michael (EP Authorized Officer), International Search Report and Written Opinion in corresponding International Application No. PCT/EP2021/072084 dated Nov. 3, 2021, 14 pages.

* cited by examiner

DISPLAY WITH SENSING AND DETECTION FUNCTIONALITY

CROSS-REFERENCE TO RELATED APPLICATIONS

This patent application is the national stage entry of International Patent Application No. PCT/EP2021/072084, filed on Aug. 6, 2021, and published as WO 2022/037975 A1 on Feb. 24, 2022, and claims the priority of European patent application 20192155.8, filed on Aug. 21, 2020, the disclosures of all of which are hereby incorporated by reference in their entireties.

FIELD OF DISCLOSURE

The present disclosure relates to a display, a display device and method to operate a display.

BACKGROUND

Flat panel display technologies are employed in various applications such as mobile devices, wearables, automotive devices and the like. A focus of current developments lies on manufacturing displays with ever higher pixel densities, improved contrast and better energy efficiency. Modern devices are starting to utilize the emerging micro light emitting devices (micro-LED) technology for forming the pixel elements of said displays. Furthermore, the focus in modern displays also lies on integrating light emitter, such as infrared light emitters, in order to provide the illumination required for applications such as proximity sensing and biometric authentication, for instance. These applications can be realized by means of employing a separate optical imaging module for sensing reflected light. Thus, micro-LED and lasers are present in state-of-the-art and next-generation displays.

In order to achieve a sensing functionality, typically a sensor is implemented behind the display by means of an ambient light sensor, a proximity sensor or as an imaging sensor. This additional sensor requires extra space, cost, and assembly effort and increases the overall stack-height of the display. This can be a challenge for mobile devices, wearable devices and smart glasses, for example. Moreover, the imaging or sensor device typically need to be synchronized with the display.

It is an object of the present disclosure to provide a display, a display device and method to operate a display with improved sensing and detection functionality.

These objects are achieved by the subject-matter of the independent claims. Further developments and embodiments are described in the dependent claims.

It is to be understood that any feature described in relation to any one embodiment may be used alone, or in combination with other features described herein, and may also be used in combination with one or more features of any other of the embodiments, or any combination of any other of the embodiments unless described as an alternative. Furthermore, equivalents and modifications not described below may also be employed without departing from the scope of the display, display device and method to operate a display which are defined in the accompanying claims.

SUMMARY

The following relates to an improved concept in the field of displays. The concept is based on the observation that micro light-emitting diodes and/or lasers, such as vertical cavity surface emitting lasers (VCSELS), depending on their bias, can be used alternately as both detector and emitter. For example, reverse biasing of said diodes or light emitting devices allows for efficient photo detection using the Stark Effect for LEDs and the Quantum-Confined Stark-Effect for lasers, such as vertical-cavity surface-emitting lasers, VCSELs.

The proposed concept suggests driving the display, e.g., a micro-LED display or a micro-LED display comprising VCSELs, to emit light in one mode of operation. In another mode of operation a sensing functionality can be achieved by reverse biasing of display subpixels, e.g., micro-LEDs, resonant cavity LEDs or lasers, such as VCSELS. This means that the same device can be employed as emitter and receiver. Thus, the display forms an electro-optical transducer which is electrically driven by a transceiver chip comprising a transceiver circuit. Consequently, the sensing functionality can be included into the display without requiring an additional sensor chip.

In at least one embodiment a display comprises a display substrate having an active display area, or an active region, which comprises a plurality of first display subpixels. A transceiver circuit is arranged to drive the display in a first mode of operation or in a second mode of operation. The first display subpixels comprise micro light-emitting diodes and/or resonant cavity light emitting devices.

For example, the display substrate can be a silicon substrate, e.g., a silicon wafer or a diced chip of a silicon wafer, comprising functional layers having circuitry for operating the pixels, such as components of a readout circuit and/or a driving circuit, for instance. The display substrate can also be of a different material such as FR4 or polyimide. For example, it is possible to grow InGaN-based LEDs and micro-LEDs directly on Sapphire and transfer them afterwards.

For forming a display image, the first display subpixels are arranged on a surface of the display substrate, thus, forming at least part of the active display area. The term "active display area" denotes that by means of the display subpixels said portion of the display is capable of emitting and/or sensing light which is incident on the active display area.

In at least one embodiment, the display comprises a further plurality of display subpixels, denoted second display subpixels. The second display subpixels comprise micro light-emitting diodes, micro-LEDs. For forming the display image, the second display subpixels too are arranged on a surface of the display substrate, thus, forming at least part of the active display area.

The active display area is formed by display subpixels, which can be of different type. The terms first and second display subpixels type are used to distinguish the display subpixels by property and/or design. This way different types of displays can be defined using a common terminology. For example, each display subpixels, i.e. of both first and second type, comprises some sort of light emitting element, e.g. of RGB colors or IR. Each of the first display subpixels, however, comprises either a micro-LED or a resonant-cavity light emitting device, while the second display subpixels may comprise a micro-LED. Furthermore, each of first display subpixels can be provided with a reverse bias such that at least these pixels are operable to detect light. In a certain sense the different types of displays discussed below build on this general concept and may or may not attribute additional features of property and/or design to display subpixels as will be apparent from the disclosure below. If not stated otherwise the term "display subpixel" may be used to attribute a feature or function to a display subpixel (first and second display subpixels), either by design (micro-LED and/or resonant-cavity light emitting device) or by way of driving a given display subpixel.

Microscopic LEDs, or micro-LEDs for short, are based on conventional technology, e.g., for forming gallium nitride based LED. However, micro-LEDs are characterized by a much smaller footprint. Each micro-LED can be as small as 5 micrometers in size, for example. Micro-LEDs enable displays with either a higher pixel density or a lower population density of active components on the display layer, i.e., the surface of the display substrate, while maintaining a specific pixel brightness or luminosity. The latter aspect allows for the placement of additional active components in the pixel layer of the display, thus allowing for additional functionality and/or a more compact design. Excelling OLEDs, micro-LEDs offer an enhanced energy efficiency compared to conventional LEDs by featuring a significantly higher brightness of the emission compared to OLEDs. This enables a near-to-infinite contrast ratio. Moreover, unlike OLEDs, micro-LEDs do not show screen burn-in effects.

A resonant-cavity light emitting device can be considered a semiconductor device, similar to a light-emitting diode, which is operable to emit light based on a resonance process. In this process, the resonant-cavity light emitting device may directly convert electrical energy into light, e.g., when pumped directly with an electrical current to create amplified spontaneous emission. However, instead of producing stimulated emission only spontaneous emission may result, e.g., spontaneous emission perpendicular to a surface of the semiconductor is amplified. A resonant photodetector is established when reverse biasing a resonant light emitting device, such as a VCSEL or resonant cavity LED, for instance.

The transceiver circuit is arranged to control both the first and second display subpixels, e.g., in the first and second mode of operation. Besides driving the display subpixels to form the display image, the transceiver circuit is configured to also drive at least the first display subpixels for detection purposes.

For example, an object that is located in a distance to or on a surface of the display is illuminated by light emission from the second display subpixels. Light which is reflected back from the object to the display can be detected by the first display subpixels. In general, driving the display subpixels in this context involves reading out photo-signals generated by those display subpixels, which are operated as photodetectors, for instance. The detected light can either be light that is emitted by the display subpixels and directed to other display subpixels by reflection, or light that is emitted in an environment of the display, e.g., ambient light. For example, the transceiver circuit operates the display by a driving scheme or by dedicated modes of operation.

In at least one embodiment, in the first mode of operation, the transceiver circuit provides a forward bias to the first display subpixels. This way the first display subpixels are operable to emit light. At least in the second mode of operation, the transceiver circuit provides a reverse bias to the first display subpixels. This way at least the first display subpixels are operable to detect light. A sequence of modes of operation may be determined by a driving scheme. For example, the first and second mode of operation may alternate or be driven in any other way demanded by the application at hand.

The improved concept allows for dynamic biasing of display subpixels. For example, by reversely biasing light emitting devices, such as micro-LEDs, and resonant-cavity light emitting device, e.g., lasers such as VCSELs, at least some display subpixels, or all of them, can be used as detectors and emitters. No additional optical components are required. In a certain sense the intelligence to inverse the polarity of the light emitters in order to make them optical sensors is included in the drive electronics, i.e. the transceiver circuit. Essentially, a transceiver circuit, implemented as driver IC, combines the functionality of driver and receiver in one building block.

In some embodiments, the display subpixels are arranged in a two-dimensional array within the active display area. Typically, displays are formed by a two-dimensional matrix arrangement, where emitting and receiving elements are co-located in a side-by-side arrangement on a display substrate.

The transceiver circuit may drive the display subpixels by way of setting the respective bias of the display subpixels. For example, whether a display subpixel is operated as detector or emitter can be defined by applying a forward or a reverse bias. In other terms, a display subpixels is operated by a positive or by a negative bias having positive or negative polarity, respectively.

Several implementations of the display are possible when using first and second display subpixels. For example, in one implementation the second display subpixels are always operated to emit light. Only the first display subpixels are operated to either detect and/or emit due to changing bias in the first and second mode of operation, respectively. In another implementation the second display subpixels may only emit light when selected to do so, while the first display subpixels are operated to detect or emit due to changing bias in the first and second mode of operation. In yet another implementation both the first and second display subpixels may, at least at times, both detect/emit due to changing bias. The first and second display subpixels may be of different type, such as micro-LED or resonant-cavity light emitting device. In another implementation both the first and second display subpixels may, at least at times or during a given mode of operation, detect and/or emit due to changing bias. However, the first and second display subpixels may be of same type, such as micro-LED. This list of implementation should not be considered exhaustive. In fact, various modifications may be made without departing from the spirit and scope of the concept described herein.

The transceiver circuit may also be operable to process photo signals which are generated by the display subpixels. For example, possible processing of photo signals may relate to comparing the photo signals or signals derived from the photo signals to reference data. Processing the photo signals can also, or alternatively, comprise determining a measurement value such as light intensity, brightness, spectral composition or a quantity derived from one of these, for instance. Furthermore, the transceiver circuit may also be arranged for synchronizing the emission and detection of the display subpixels, e.g. for proximity or distance detection.

In at least one embodiment, the display comprises a plurality of both first and second display subpixels. The second display subpixels comprise micro light-emitting diodes, micro-LEDs. The transceiver circuit provides a same bias to the second display subpixels in both the first and second mode of operation. This way the second display subpixels operate as emitters or as detectors in both the first and second mode of operation. The same bias can be the forward or reverse bias, or any other bias to operate the display subpixels.

In addition, or alternatively, in the first mode of operation, the transceiver circuit provides a forward bias to the second display subpixels. This way the second display subpixels are provided with the forward bias and are operable to emit light. This way both the first display subpixels and the second display subpixels are operated to emit light during the first mode of operation as they receive the forward bias.

Furthermore, in the second mode of operation, the transceiver circuit provides a reverse bias to the second display subpixels. This way the second display subpixels are provided with the reverse bias and are operable to detect light. In other words, during the second mode of operation the first display subpixels and the second display subpixels are operated to detector light as they receive the reverse bias.

In at least one embodiment only a subset of second display subpixels may receive the same bias to the first display subpixels in both the first and second mode of operation. Similarly, in at least one embodiment only a subset of second display subpixels may receive the forward bias during the first mode of operation or may receive the reverse bias during the second mode of operation. This may be implemented by hardwired electrical interconnections or may be selected via electrical switches. Thus, the actual layout of the display and the functionality attributed to its display subpixels can be altered to a large extent.

In case the second display subpixels are supplied with the same bias, i.e., forward and reverse bias, according to the first and second mode of operation, the distinction between first and second display subpixels may not be necessary to describe their functionality. Consequently, if this is the case all that is being disclosed herein with respect to first display subpixels may apply to the second display subpixels and vice versa.

In at least one embodiment the first and second mode of operation alternate such that the first display subpixels alternate to operate as emitters or detectors of light. Alternating the modes of operations may allow to implement the sensor functionality as needed. For example, the two modes may alternate within a refresh rate of the display and, thus, may not be noticed by human perception. The refresh rate typically depends on the size of the display. For example, refresh rates higher than 60 or 72 Hz are typically not noticeable. The detection functionality of the display subpixels may not interfere with the function of the display, i.e., display of images and video.

In addition, or alternatively, the first display subpixels comprise at least a first and a second subset, such that, during the second mode of operation, display subpixels from the first and the second subset alternate to operate as emitters or detectors of light. Certain types of sensor functionality may involve both a detector and an emitter, e.g., proximity or distance detection. By grouping the display subpixels into the aforementioned subsets may achieve such pairs of detector and emitter. The subsets may be implemented by hardwired electrical interconnections or may be selected via electrical switches. Thus, the actual allocation into the subsets can be altered to a large extent as needed by the application at hand.

In at least one embodiment the transceiver circuit is arranged to receive and output sensor signals generated by display subpixels in the second mode of operation. Thus, the transceiver is operable to provide the bias, e.g. forward and reverse bias, but is also involved in control of signal acquisition. Thus, the "intelligence" to inverse the polarity of the light emitters' bias in order to make them optical sensors is included into the drive electronics. Essentially, the driver IC is complemented such that it is a transceiver IC featuring the functionality of driver and receiver in one building block.

In at least one embodiment the transceiver circuit is electrically connected to the first and/or the second display pixels by way of selectable electrical connections. The transceiver circuit comprises an input terminal to receive one or more select signals to select the selectable electrical connections, respectively. Finally, the transceiver circuit provides the forward bias, reverse bias or same bias via the selected electrical connections depending on the one or more select signals.

Whether a display subpixel has the function of a first or second display subpixel may be determined by type and layout of the display. However, the selectable electrical connections allow for more degree of freedom as display subpixels may be selected via electrical switches, for example. This way the role, and thus functionality, of first and second display subpixels may be changed, and, consequently, a same display subpixel may act as emitter in one selected connection or as detector in another selected connection.

In at least one embodiment the active display area comprises a plurality of pixels. The pixels are formed by at least one first display subpixel and at least one second display subpixel. The display subpixels form the smallest functional unit of the display. "Pixels" can be considered a functional unit at a higher level as they comprise at least one first display subpixel and at least one second display subpixel. For example, the pixels may form functional pairs, wherein one display subpixels acts as emitter while the other acts as detector. A given first display subpixel comprises a micro light-emitting diode or a resonant-cavity light emitting device, while a second display subpixel may comprise only a micro light-emitting diode.

In turn, the display subpixels can likewise be formed as a two-dimensional array of subpixels. For example, the pixels comprise RGB micro-LEDs as light emitting subpixels in a Bayer configuration and a second display subpixel may further provide an additional light capturing subpixel, such as a micro photodiode. Alternatively, a light emitting display subpixel in a pixel, e.g., a green pixel of a Bayer arrangement, can be sacrificed for a light capturing display subpixel, for instance.

In at least one embodiment the pixels comprise at least two first display subpixels and at least one second display subpixels. The at least two first display subpixel comprise a micro light-emitting diode and a resonant-cavity light emitting device. Furthermore, the at least one second display subpixels comprise a micro light-emitting diode. In other words, the first display subpixels may either be a micro light-emitting diode or a resonant-cavity light emitting device, depending on the desired functionality of the display.

In at least one embodiment the emission and detection properties of the subpixels are defined by an emission spectrum and an absorption spectrum, respectively. Together the emission spectrum and an absorption spectrum form a spectral characteristic. The pixels comprise at least one first display subpixel of a first spectral characteristic and at least one second display subpixel of a second spectral characteristic, which is different from the first spectral characteristic.

The emission spectra and absorption spectra, or bands, can be characterized by band maxima of emission and absorption, respectively. In the field of display technology display subpixels may be designated red, green, blue or infrared pixel. This denotes band maxima of emission in the red, green, blue or infrared, respectively. Thus, the first and second spectral characteristic introduced above denote that the corresponding display subpixels grouped into a given pixel have different emission, e.g., red, green, blue or infrared bands.

A display subpixel may show emission as characterized by its emission spectrum. However, the same display subpixel may also show absorption as characterized by its absorption spectrum. Emission for these subpixels may correspond to a smaller bandgap, while absorption corresponds to a larger bandgap, for example. In such a case the Stokes shift is non-zero and denotes the difference between positions of the band maxima of the absorption and emission spectra. For example, a micro light-emitting diode may feature high emission, but low absorption for a given wavelength. For instance, a red display subpixel may thus absorb in the green and blue absorption bands etc.

In at least one embodiment the pixels comprise at least one first display subpixel having emission spectrum and an absorption spectrum with zero spectral shift, i.e., band maxima of emission and absorption are the same. For example, certain types of resonant-cavity light emitting devices can be configured to have emission spectra and absorption spectra with zero spectral shift, e.g. VCSEL laser diodes. In fact, emission spectra and absorption spectra may also be identical.

In at least one embodiment the pixels comprise at least three micro light-emitting diodes. A first micro light-emitting diode of the first spectral characteristic is configured as a first display subpixel. A second micro light-emitting diode of the second spectral characteristic is configured as a second display subpixel. A third micro light-emitting diode of a third spectral characteristic is configured as a first display subpixel. The third spectral characteristic is different from the first and second spectral characteristics. For example, in reference to the second spectral characteristic, the first spectral characteristic has a positive shift and the third spectral characteristic has a negative shift.

For example, the at least three micro light-emitting diodes are red, green, and blue display subpixels, according to their spectral characteristic. However, the display subpixels forming a pixel may have any other type of colors, e.g. emission in the IR. Furthermore, there may be more than three display subpixels forming a RGGB, RGB-NIR pixel, for example. The negative and positive shift can be expressed in energy, wave number or frequency units. Thus, the terms “negative” and “positive” are determined by the unit used to express the shift. In general, the negative or positive shift may or may not correspond to the Stokes shift. These terms are used as a relative measure of emission and absorption hereinafter.

The display subpixels forming a pixel can be adjusted in their spectral properties as expressed by the negative or positive shift. This way a display subpixel may emit in a band which, in turn, can be detected by a neighboring display subpixel. For example, a red display subpixel may emit in the red band and absorb in the green and blue absorption bands. Thus, the red display subpixel may be complemented with a green and blue display subpixel to form a pixel. As emission and detection can be changed in the first and second mode of operation, the display subpixels can be used as emitters and detector at the pixel level.

In at least one embodiment at least one resonant-cavity light emitting device comprises a high Q resonator arranged for additional absorption in an absorption band of the micro light-emitting diodes.

While emission and absorption of display subpixels can be altered depending on the applied bias, the spectral characteristic cannot. This means that emission may be stronger than absorption, for example. Furthermore, a spectral shift typically is a material property, e.g. on the bandgaps involved. The resonator of a resonant-cavity light emitting device, however, may be adjusted within some margin by layout of the device. This way an absorption band can be arranged to overlap with an absorption band of a micro light-emitting diode, e.g. a neighboring micro light-emitting diode in a pixel. A high Q can be considered a value which is high enough to absorption to a combined absorption band of display subpixels in a pixel. Hereinafter a value of the optical quality factor Q is considered “high” if it is larger than 1. In some embodiments the optical quality factor is larger than 10. A large Q factor improves the absorption of the resonant light emitting device when operating in reverse direction. Therefore, a reasonable responsivity can be achieved.

In at least one embodiment the resonant-cavity light emitting devices comprise at least one of a vertical-cavity surface-emitting laser, VCSEL, or a micro disk laser.

In at least one embodiment a display device comprises a display according to one the aspects discussed above as well as a host system. The host system may comprise a mobile device, such as smartphone, smart watch, artificial reality or virtual reality enabled device, a mobile phone, consumer electronics, an Advanced Driver Assistance System, ADAS, a medical device, a human interface device, and/or similar devices.

In at least one embodiment the display, in the second mode of operation, is operable as an ambient light sensor, a proximity sensor, a distance sensor, a fingerprint sensor, and/or a gesture sensor. For example, authentication or identification of a driver could be integrated by fingerprint, palm detection, etc. Other applications include ambient light detection, proximity detection and biometric sensing (e.g. fingerprint sensing). Nevertheless, it can also be used for medical, industrial and automotive applications (e.g., sat-nav displays in cars).

The object is further solved by a method to operate a display comprises. In at least one embodiment the display comprises a display substrate having an active display area comprising a plurality of first display subpixels. The first display subpixels comprise micro light-emitting diodes and/or resonant-cavity light emitting devices. A transceiver circuit is arranged to drive the display in a first mode of operation or in a second mode of operation. The method comprises the steps of, in a first mode of operation, provide a forward bias to the first display subpixels by means of the transceiver circuit. The first display subpixels are operated to emit light. In the second mode of operation, a reverse bias is provided to the first display subpixels by means of the transceiver circuit. The first display subpixels are operated to detect light.

Further embodiments of the method to operate a display according to the improved concept become apparent to a person skilled in the art from the embodiments of the display and the display device described above.

The following description of figures of example embodiments may further illustrate and explain aspects of the improved concept. Components and parts with the same structure and the same effect, respectively, appear with equivalent reference symbols. Insofar as components and parts correspond to one another in terms of their function in different figures, the description thereof is not necessarily repeated for each of the following figures.

DETAILED DESCRIPTION

Figure 1:
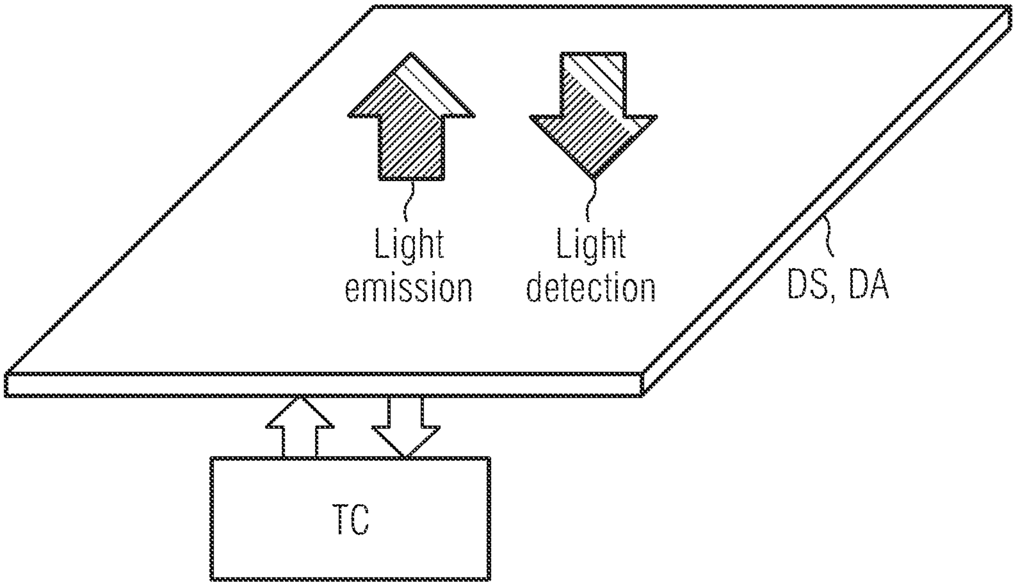
FIG. 1 shows an example embodiment of a display.

FIG. 1 shows an example embodiment of a display. The display 1 comprises display subpixels which are arranged on a display substrate DS and forming an active display area DA of the display. The display subpixels can be of different type. In general, the display subpixels may be any type of micro light-emitting diode (micro-LED) or resonant-cavity light emitting device, including a vertical-cavity surface-emitting laser (VCSEL), microdisk laser, resonant cavity light emitting diode or distributed feedback laser (DFB), for example. In this embodiment, the display comprises an array of micro-LEDs and VCSELs. Together the display subpixels, including the VCSELS, are operable to form display images. Display subpixels are grouped together and form functional units or pixels. This will be discussed in further detail below.

The display subpixels can be further categorized into first display subpixels and second display subpixels. This distinction foremost reflects differences in function and not necessarily in type of display subpixels. In general, first display subpixels can be any type of micro light-emitting diode (micro-LED) or resonant-cavity light emitting device. However, second display subpixels are micro-LEDs, hereinafter.

Besides different hardware type the display subpixels can be altered in their functionality by means of a bias applied to them. The bias is provided by means of a transceiver circuit TC. The transceiver circuit is electrically connected to the array of display subpixels. For example, the transceiver circuit is configured to address the display subpixels individually. Thus, the transceiver operates as a driver of display subpixels, e.g. to form and show a display image. By way of the electrical connections the transceiver circuit provides a bias to the display subpixels. At least the first display subpixels may receive a forward or a reverse bias (or positive and negative bias). Which bias is applied to the display subpixels is defined according to a mode of operation of the display. For example, in a first mode of operation, the transceiver circuit TC provides a forward bias to the first display subpixels. In a second mode of operation, the transceiver circuit TC provides a reverse bias to the first display subpixels.

Depending on the mode of operation display subpixels can be operated as light detector or emitter. Whether a display subpixel operates as detector or emitter depends on the bias it receives from the transceiver circuit. For example, reverse biasing the first display subpixels allows for efficient photo detection using the Stark Effect for micro-LEDs and the Quantum-Confined Stark-Effect for VCSELs. This way, a VCSEL can absorb visible or IR light and a red LED can absorb blue and green light. This will be discussed in further with respect to the following figures.

As a more general guideline, however, the transceiver circuit is operable to drive the display, e.g., a micro-LED display or a micro-LED display comprising VCSELs, such as to emit light. By reverse biasing the micro-LEDs or the VCSELS, a sensing functionality can be achieved. This means that the same device can be employed as emitter and receiver, thus forming an electro-optical transceiver. Consequently, the sensing functionality can be included into the display without requiring an additional sensor chip. Basically, the display acts as a transceiver, driven by the transceiver circuit. No additional optical components are required. The "intelligence" to inverse the polarity of the display subpixels in order to make them optical sensors is comprised by the drive electronics, i.e. the transceiver circuit.

The transceiver circuit can be an integrated circuit and be considered a driver IC which is modified to include driver and receiver in one building block. Thus, the transceiver circuit is also operable to read out photo-signals which are generated by those display subpixels which are operate as photodetectors, for instance. In this context, the modes of operation may be controlled by a processing unit, such as a microcontroller or a display processor. The processing unit controls timing and synchronization operations in order define the sensor functionality, e.g. by alternating the modes of operations as needed. For example, the two modes may alternate within a refresh rate of the display and, thus, may not be noticed by human perception. The refresh rate typically depends on the size of the display but should at least be higher than 60 or 72 Hz. The detection functionality of the display subpixels may not interfere with the function of the display, i.e. display of images and video.

Figure 2A:
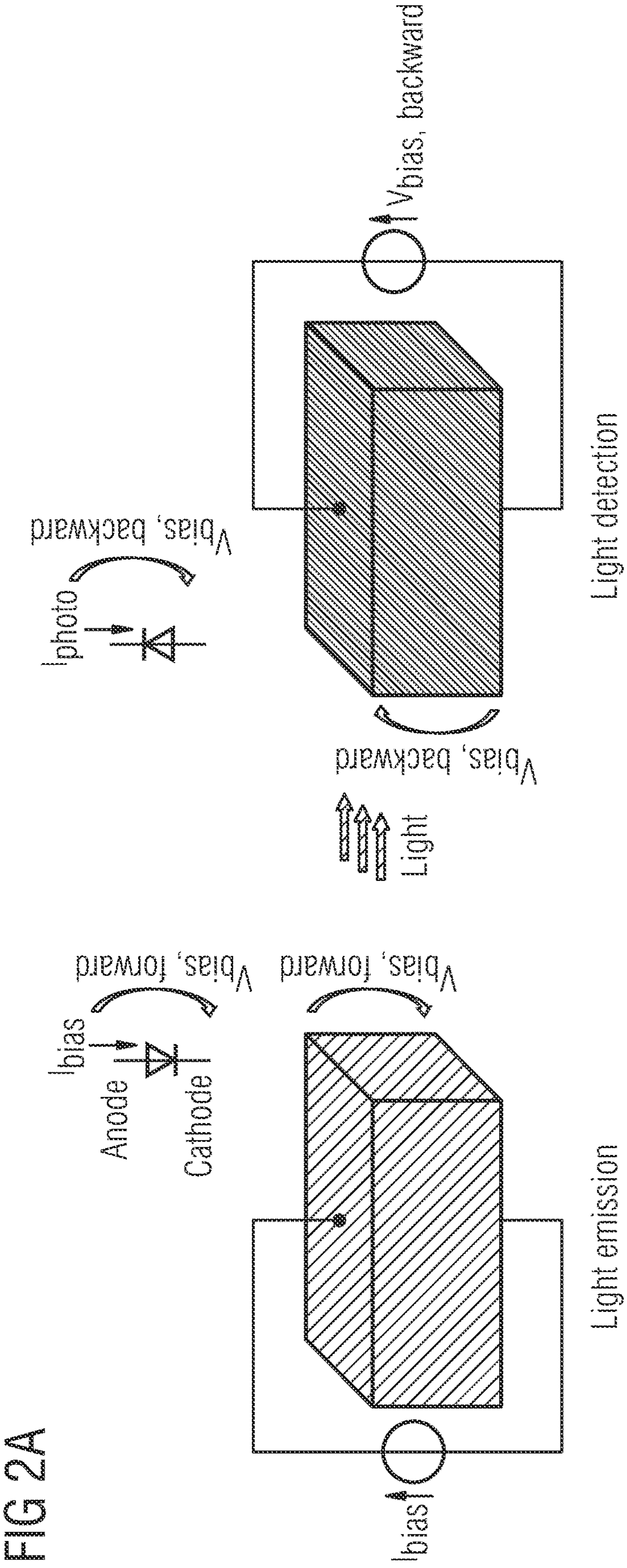
FIGS. 2A to 2C show example embodiments of display subpixels.
Figure 2B:
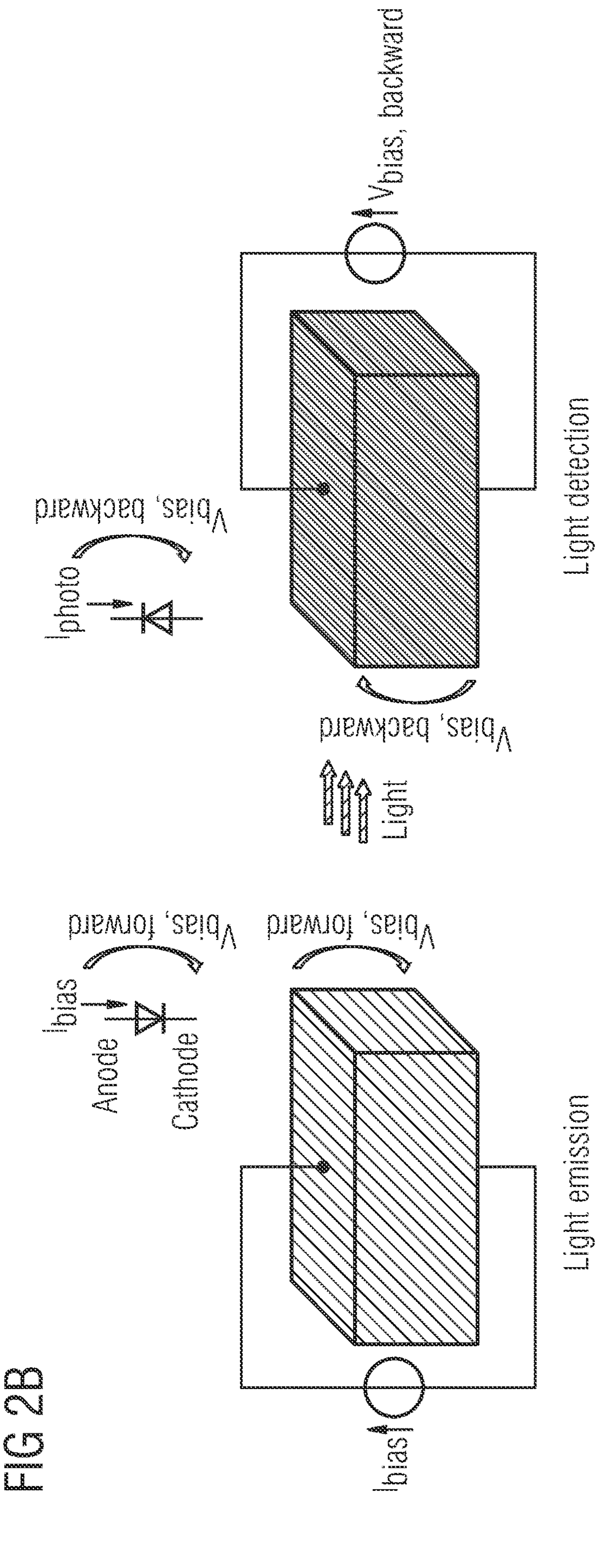
Figure 2C:
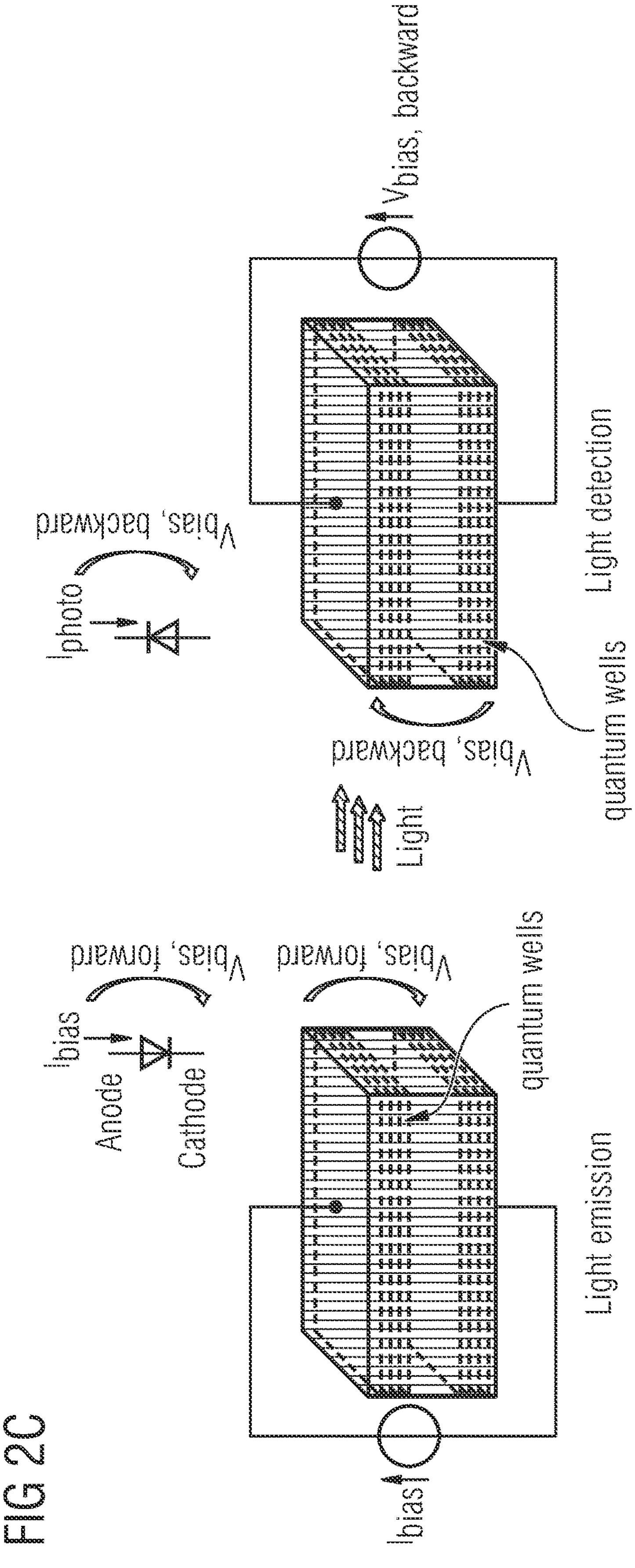

FIGS. 2A to 2C show example embodiments of display subpixels. The drawings show display subpixels, e.g. neighboring display subpixels arranged next to each other on the display substrate.

The display subpixels are arranged for light emission when they are provided with a forward bias Vbias,forward. In this example, the display subpixel shown on the left side emits light in the green emission band. The display subpixel on the right side, however, is biased differently, reverse bias represented as Vbias,backward. This display subpixel would emit in the red emission band when provided with the forward bias. However, when biased with the reverse bias Vbias,backward the display subpixel is operable to detect light, e.g. in the green emission band emitted by one or more neighboring display subpixels (see FIG. 2A). The different bias conditions are provided to the display subpixel by inverting polarity of the bias current between Ibias,forward and Ibias,backward, as illustrated by the diode symbols in the drawing. The transceiver circuit is configured to alter the polarity of the bias current and provide this current to the display subpixels during the first and second mode of operation.

A display subpixel emitting in the red emission at forward bias may also detect light in the blue emission band (see blue emitting display subpixel in FIG. 2B, for example). The emission/detection properties of the micro-LEDs are determined by their spectral characteristics. The Stark effect describes how emission is shifted to the red vs absorption depending on the applied bias. For micro-LEDs emission corresponds to "smaller bandgap", whereas absorption corresponds to "larger bandgap". As a consequence a red micro-LED (with predominant emission in the red band at Ibias,forward) can absorb in the green and blue bands (at Ibias,backward). Typically, emission and absorption are shifted with respect to each other.

FIG. 2C shows an example embodiment of resonant-cavity light emitting device alternating between light emission and light detection. In this example, the resonant-cavity light emitting device is a VCSEL. A display subpixel implemented by a VCSEL can also be supplied with bias currents of inverted polarity, i.e. the bias current changes between Ibias,forward and Ibias,backward. This way there is a forward bias Vbias,forward or reverse bias Vbias,backward across the VCSEL. The VCSEL emits light when biased with Ibias,forward and detects light when biased with Ibias,backward. For example, the VCSEL can absorb in the green and blue bands (at Ibias,backward).

However, emission and absorption of a VCSEL may be configured to have no or small shift with respect to each other. This is due to the quantum-confined Stark effect, which in general describes the effect of an external electric field upon the light absorption spectrum or emission spectrum of a quantum well. It has been realized that reverse biasing of VCSELs, but also other resonant-cavity light-emitting devices, allows for efficient photo detection. This way, an infrared VCSEL can absorb light, e.g. IR and visible light, for instance.

For example, a VCSEL comprises an active quantum wall (QW) region inserted between two dielectric Bragg reflector (DBR) mirrors consisting of quarter wave stacks made of alternating high and low refractive index layers. The structure can be grown on an n-type GaAs substrate, and the mirrors are doped n- or p-type to form a p-n junction. Electrons and holes are injected into the active region under a forward bias. Eventually the electrons and holes are captured by the QWs and produce gain at the lasing wavelength. Conventional VCSEL structures grown on GaAs substrates operate in the wavelength range between 700 and 1100 nm, for example. However, at reverse bias the active region of the VCSEL is operable to act as a light absorption medium and the VCSEL can be used as light detector or sensor.

Figure 3A:
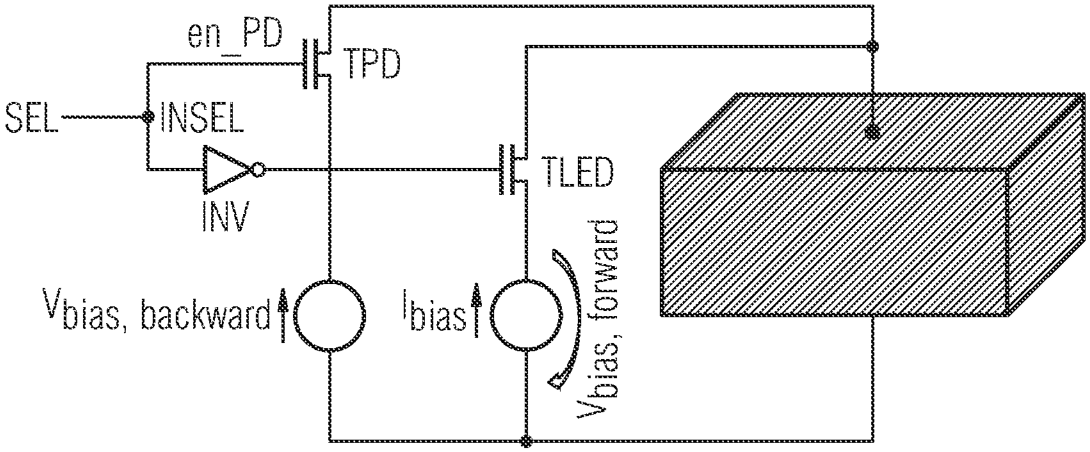
FIG. 3A, 3B show example embodiments of a transceiver circuit.
Figure 3B:
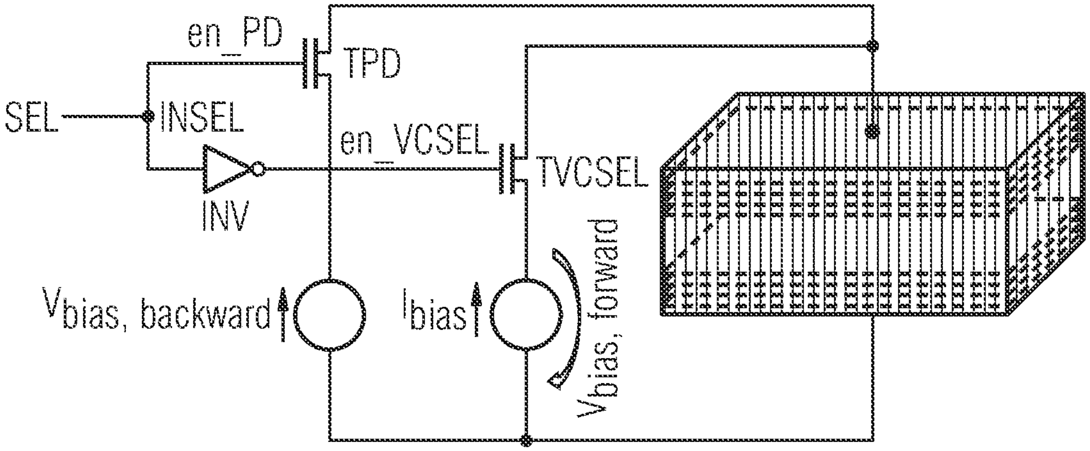

FIGS. 3A and 3B show example embodiments of transceiver circuit. In fact, only a part of the transceiver circuit and a single display subpixel are depicted in the drawings, respectively. The part of the transceiver circuit shown in FIG. 3A comprises two branches with switches TPD and TLED.

The first branch is arranged for light emission. The switch TLED in this example is represented by a transistor. Transistor terminals, e.g. emitter and collector, are connected to the display subpixel, i.e. a micro-LED in this case. In order to operate the display subpixel as emitter, a bias current source Ibias is coupled between the display subpixel and the transistor. The bias current source is arranged such that Vbias,forward drops over the display subpixels. A control terminal of the transistor, e.g. its base, is connected to an output side of an inverter.

The second branch is arranged for light detection. The switch TPD in this example is represented by a transistor. Transistor terminals, e.g. emitter and collector, are connected to the display subpixel, i.e. the micro-LED. In order to operate the display subpixel as detector, a bias voltage Vbias,backward drops over the display subpixels, as indicated in the drawing. When biased in this way, the display subpixel is operable to detect light and generate a photocurrent IPHOTO. A control terminal of the transistor TPD, e.g. its base, is connected to an input terminal INSEL of the transceiver circuit. Furthermore, an input side of the inverter is also connected to the input terminal INSEL. During operation the transceiver circuit provides or receives a select signal SEL at the input terminal INSEL. For example, the select signal comprises a succession of rising-edges and falling-edges. With every changing edge in the select signal the switches TPD and TLED open and close, respectively. Due to the inverter in the path to TLED either TPD or TLED is open or closed. As a consequence, the transceiver circuit provides either the forward bias or reverse bias and the display subpixel operates as emitter or detector, respectively. Thus, the select signal defines two modes of operation, such that in the first mode of operation, the transceiver circuit TC provides the forward bias to the display subpixel PX2, such that the display subpixel PX2 emits light, and, in the second mode of operation, the transceiver circuit TC provides the reverse bias to the display subpixel PX2, such that the second display subpixels PX2 detects light. FIG. 3B shows another part of the transceiver circuit which is arranged to drive a resonant-cavity light emitting device, in this embodiment a VCSEL, instead. The switch TLED is exchanged to switch TVCSEL. Other than that the two circuits shown in FIGS. 3A and 3B are the same.

Figure 4A:
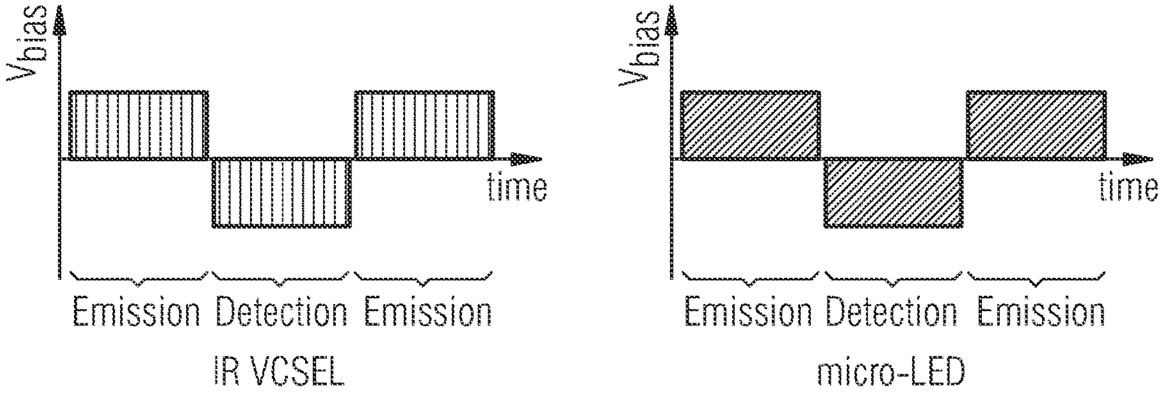
FIG. 4A to 4D show example timing diagrams.

FIGS. 4A to 4D show example timing diagrams. FIG. 4A shows a bias voltage of a VCSEL (left side) and micro-LED (right side) as a function of time. In general, the display subpixels may be of the same or different type, i.e. a micro-LED or a resonant-cavity light emitting device. Both these types of display subpixels can be operated as emitter or detector depending on which bias they are provided with. Emission and detection and, thus, first and second mode of operation, may alternate as shown in the timing diagram. Furthermore, the diagram shows that the modes of operation are also reflected in alternating changes of polarity of the bias voltage.

The display pixels can be further categorized into first display subpixels and second display subpixel. As discussed above, these categories reflect differences in function rather than type of display subpixels. For example, a micro-LED may be a first display subpixel or a second display subpixel. However, a resonant-cavity light emitting device is always considered a first display subpixel.

Figure 4B:
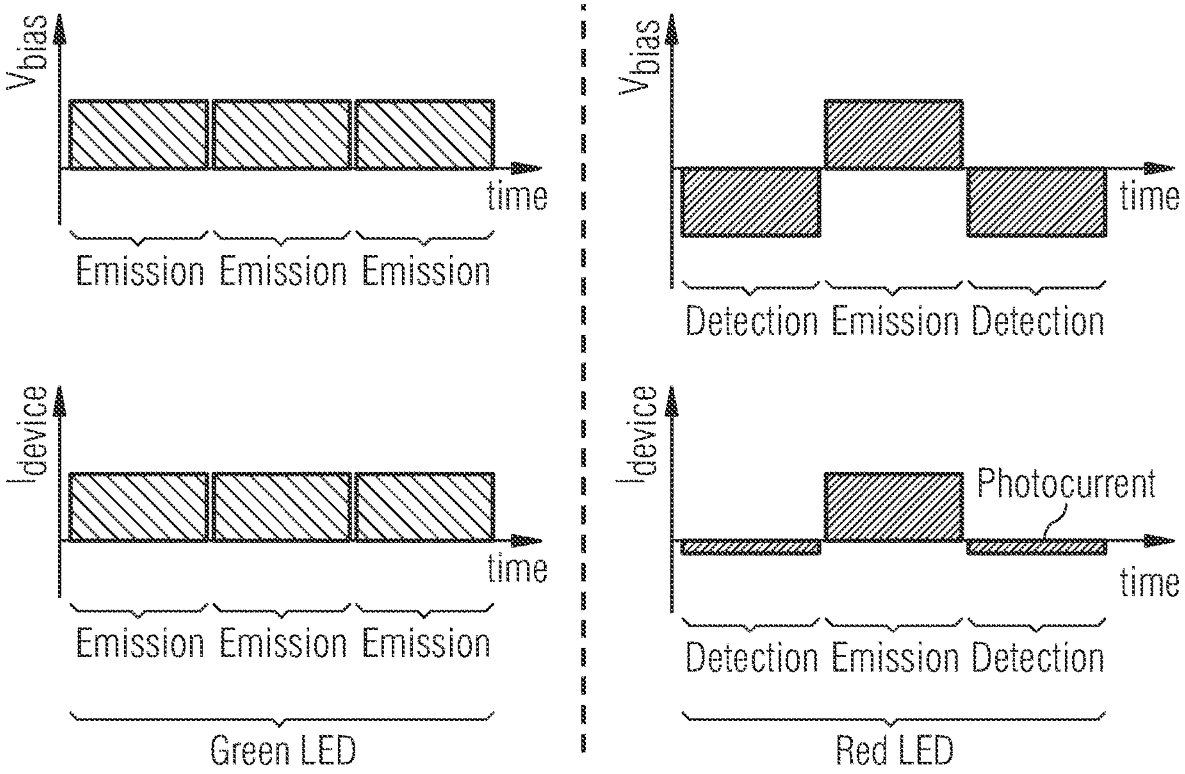

The timing diagram on the left side of FIG. 4B shows an example of a second display subpixel, e.g. a micro-LED emitting in the green band (denoted green LED hereinafter). The two graphs show the bias voltage Vbias and current of the device Idevice as functions of time. The green LED is supplied with the same polarity bias despite the alternating modes of operation. Thus, a second display subpixel may be considered one that receives a same bias in both the first and second mode of operation. In other words, a second display subpixel, at least for a certain period of time, is operated as emitter. Consequently, the green LED emits in the green band and can be used to display an image.

Figure 4C:
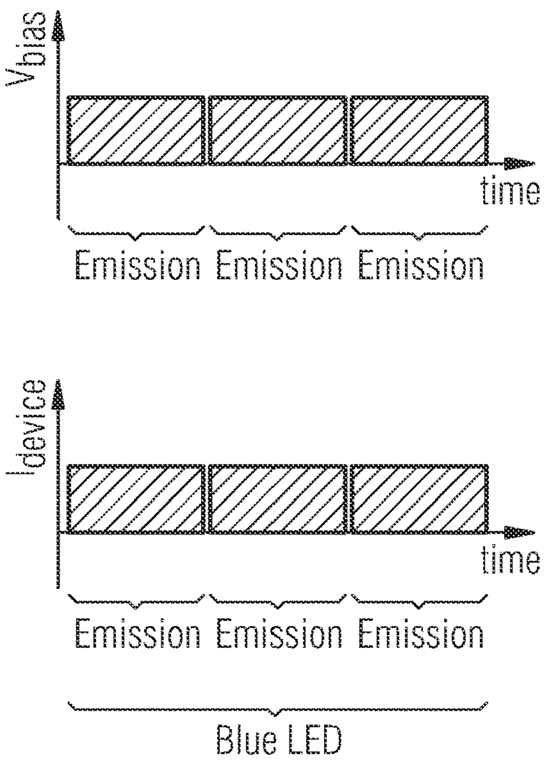

The timing diagram on the right side of FIG. 4B shows an example of a first display subpixel, e.g. a micro-LED emitting in the red band (denoted red LED hereinafter). The two graphs show the bias voltage Vbias and current of the device Idevice as functions of time. The red LED is supplied with a bias of alternating polarity according to the alternating modes of operation. Thus, a first display subpixel can be considered one that receives bias of alternating polarity, e.g. forward and reverse bias, in the first and second mode of operation, respectively. In other words, a first display subpixel, at least for a certain period of time, is operated as emitter or detector. This can be seen from the graph, as during detection the current of the device Idevice corresponds to a photocurrent IPHOTO. FIG. 4C corresponds to FIG. 4B but shows a micro-LED emitting in the blue band (denoted blue LED hereinafter) on the left side.

Figure 4D:
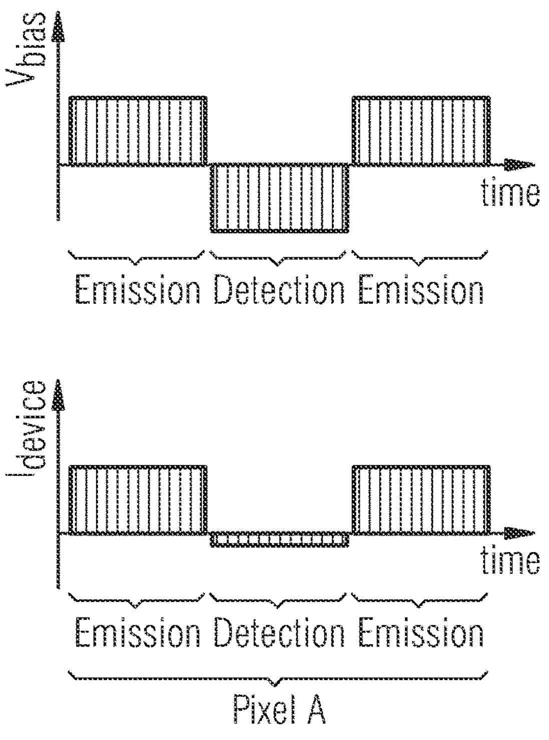

FIG. 4D shows the timing diagrams of Vbias and Idevice for two resonant-cavity light emitting device, e.g. VCSELs, representing two first display subpixels. The graph on the left represents a first VCSEL and the graph on the right represents a second VCSEL. The first VCSEL is supplied with a bias of alternating polarity according to the alternating modes of operation, and, thus at least for a certain period of time, is operated alternatingly as emitter or detector. This can be seen from the graph, as during detection the current of the device Idevice corresponds to a photocurrent IPHOTO. At the same time the second VCSEL is also supplied with a bias of alternating polarity according to the alternating modes of operation, and, thus at least for a certain period of time, is operated alternatingly as emitter or detector. However, the modes of operation and, consequently, the timing of emitter or detector are shifted. At times the first VCSEL operates as emitter, the second VCSEL operates as detector, and vice versa. Thus, the modes of operation may be defined on a per-pixel basis.

Figure 5A:
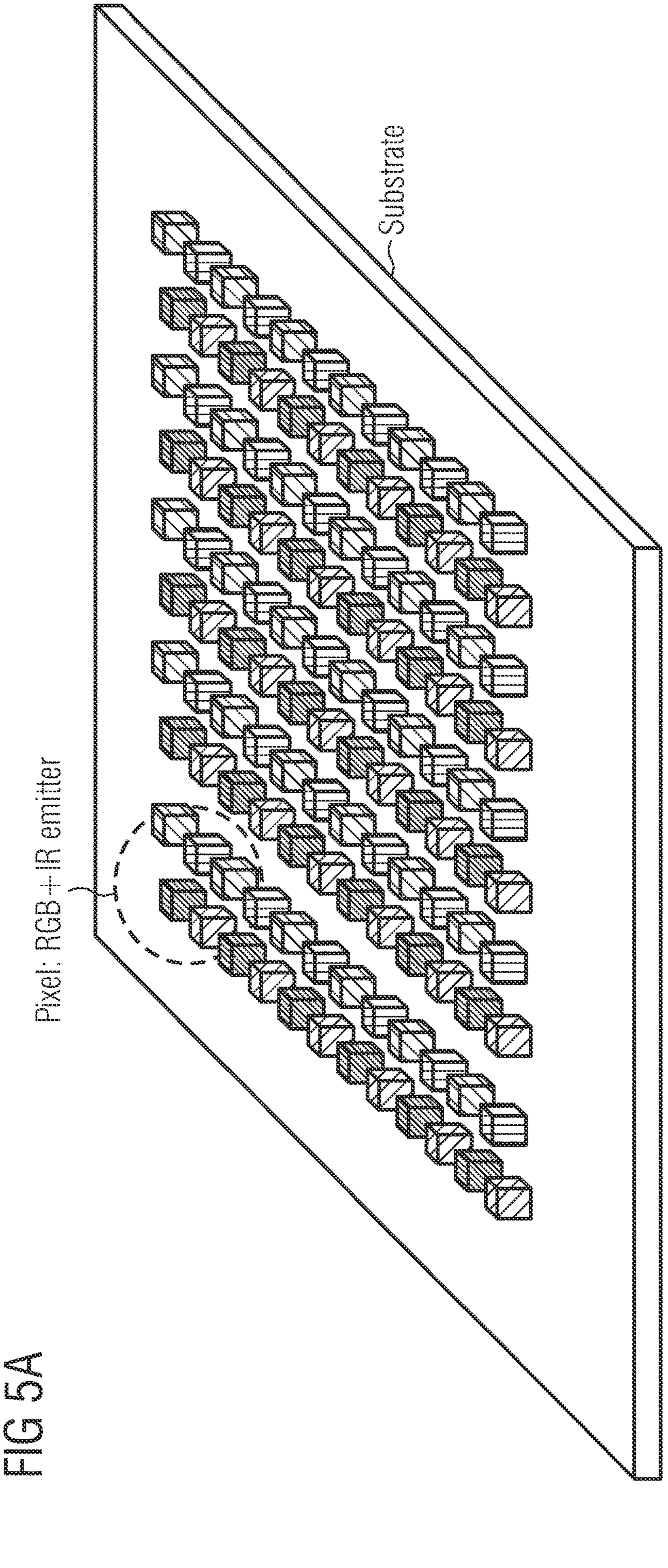
FIGS. 5A, 5B show an example display.
Figure 5B:
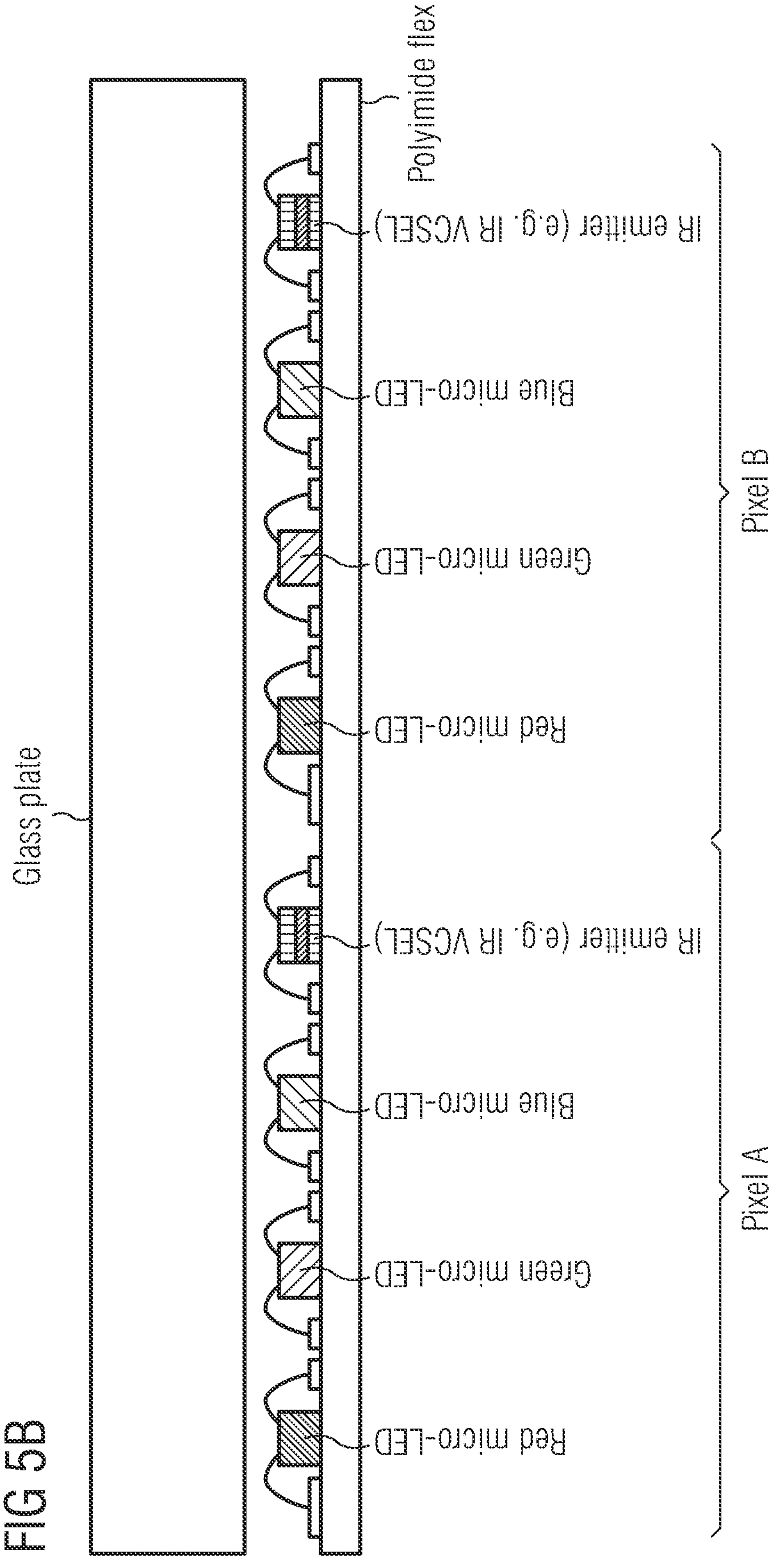

FIGS. 5A, 5B show an example display. FIG. 5A shows a top view of the example display. In an implementation of display the display subpixels are arranged on a display substrate in an array of subpixels, wherein the subpixels form functional units, called pixels hereinafter. Pixels comprise at least two display subpixels, one being a first display subpixel and the other one being a second display subpixel. In the embodiment of FIGS. 5A and 5B a pixel comprises a red, green and blue micro-LED which are operable to emit in the red, green, and blue emission bands, respectively. Furthermore, a pixel also comprises a VCSEL which is operable to emit light in the infrared, for example. The plurality of pixels constitute the active display and are controlled by the driver circuitry, including the transceiver circuit, to display an image or video. At least some of the subpixels are then emitting light their respective bands. FIG. 5B shows a side view of the example display, which may be complemented with a cover, such as a glass plate.

Apart from its core functionality of displaying images and videos the display features a detector functionality. Depending on what type of sensor is to be implemented the design of pixels and the way of controlling them may differ. For example, the display may operate as a proximity sensor, fingerprint sensor or time-of-flight sensor. In these embodiments, the pixels comprise a red, green and blue micro-LED as well as an IR VCSEL as display subpixels. Each pixel in the array has neighboring pixels of the same composition, i.e. RGBIR, for example.

The sensor functionality is implemented by the way the display subpixels are biased as a function of time. For example, the green and blue micro-LEDs are biased as second display subpixels, i.e. with a same bias, and, thus, operate as emitters. The red micro-LED and the IR VCSEL are biased as first display subpixels, i.e. with a bias of changing polarity depending on the mode of operation, and, thus, alternately operate as emitters and detectors.

At the same time neighboring pixels operate according to the same modes of operation but with the timing of emitter or detector are shifted. At time the IR VCSEL operates as emitter, a VCSEL of a neighboring pixel operates as detector, and vice versa. This way, emission and detection can be synchronized among a pixel and its neighboring pixels. The shifting of timing of the modes of operation can be adjusted to allow for proximity detection of a desired range. In fact, the desired range also is a function of time delay, and, thus, shifting between emission and detection. The sensor signals, e.g. photocurrents, generated in this way are received by the transceiver circuit and processed in a processing unit, e.g., a microcontroller, to yield proximity or time-of-flight information. In case a larger number, or all pixels, are involved to implement the detector functionality, a fingerprint may be mapped and detected.

In a modification, emission by the green and blue micro-LEDs may be terminated for the duration of the second mode of operation of the neighboring pixels so that no green, blue emission occurs. In fact, the timing can be adjusted to fit best to the desired application and detector functionality.

A range of detection can be adjusted or extended depending on which neighboring pixels are involved in the detection. For example, if all direct neighboring pixels are involved this translates into a first range. However, if only farther away (with respect to relative distance in the array) pixels are involved this translates into a second range or further ranges. The direct neighbors may then be neglected or may not operate as detectors for a certain time.

In another example, the display may operate as an ambient light sensor or a color sensor. In order to achieve a high signal-to-noise ratio a large number of pixels or even all pixels may be involved in detection. Rather than having shifted timing of emission/detection among neighboring pixels, all pixels are synchronized. For example, all second display subpixels operate as detectors at a time. This way a large surface area of the display can act as detector and collect ambient light. Due to the different spectral characteristics of the display subpixels, sensor signals may also be collected as a function of wavelength. Thus, signal processing may also yield color information and the display acts as color sensor.

The role of first and second display subpixels depends on the bias, which is supplied by the transceiver circuit. The transceiver circuit also determines the timing and polarity of the bias. Thus, the transceiver circuit determines whether a given display subpixels is a first and second display subpixel. This allows for a large degree of freedom to implement and execute the emission/detection functionality of the display.

The use of VCSELs as first display subpixels allows for extending absorption, e.g. of the red micro-LEDs. Emission and absorption of display subpixels can be altered depending on the applied bias, however, the spectral characteristic cannot. This means that emission may be stronger than absorption, for example. Furthermore, a spectral shift typically is a material property, e.g. on the bandgaps involved. The resonator of a resonant-cavity light emitting device, however, may be adjusted within some margin by layout of the device. This way an absorption band can be arranged to overlap with an absorption band of a micro light-emitting diode, e.g., a neighboring micro light-emitting diode in a pixel. A high Q can be considered a value which is high enough to achieve a meaningful absorption in a pixel. Meaningful means a quantum efficiency of larger than 1%, preferably larger than 10%.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

A number of implementations have been described. Nevertheless, various modifications may be made without departing from the spirit and scope of the invention. Accordingly, other implementations are within the scope of the claims.

The invention claimed is:

1. A display comprising:

a display substrate having an active display area comprising a plurality of first display subpixels, and a transceiver circuit arranged to drive the display in a first mode of operation or in a second mode of operation;

wherein:

the first display subpixels comprise micro light-emitting diodes and/or resonant-cavity light emitting devices, in the first mode of operation, the transceiver circuit provides a forward bias to the first display subpixels, such that the first display subpixels are operable to emit light, in the second mode of operation, the transceiver circuit provides a reverse bias to the first display subpixels, such that the first display subpixels are operable to detect light, and the first display subpixels comprise:

a red display subpixel that emits in a red band and detects in a green band and a blue band;

a blue display subpixel that emits in the blue band and detects in the red band and the green band; and a green display subpixel that emits in the green band and detects in the red band and the blue band.

2. The display according to claim 1, wherein the display comprises a plurality of second display subpixels, the second display subpixels comprise micro light-emitting diodes, micro-LEDs, the transceiver circuit provides a same bias to the second display subpixels in both the first and second mode of operation, and/or in the first mode of operation, the transceiver circuit provides a forward bias to the second display subpixels, such that the second display subpixels provided with the forward bias are operable to emit light, and, in the second mode of operation, provides a reverse bias to the second display subpixels, such that the second display subpixels provided with the reverse bias are operable to detect light.

3. The display according to claim 2, wherein the second display subpixels operate as emitters or as detectors of light during both first and second mode of operation.

4. The display according to claim 2, wherein the transceiver circuit is electrically connected to the first and/or the second display pixels by way of selectable electrical connections, the transceiver circuit comprises an input terminal to receive one or more select signals to select selectable electrical connections, respectively, and the transceiver circuit provides the forward bias, reverse bias or same bias via the selected electrical connections depending on the one or more select signals.

5. The display according to claim 2, wherein the active display area comprises a plurality of pixels, and the pixels are formed by at least one first display subpixel and at least one second display subpixel.

6. The display according to claim 5, wherein the pixels comprise at least two first display subpixels and at least one second display subpixel, the at least one second display subpixel comprises a micro light-emitting diode, and the at least two first display subpixels comprise a micro light-emitting diode and a resonant-cavity light emitting device.

7. The display according to claim 5, wherein emission and detection properties of the display subpixels are defined by an emission spectrum and an absorption spectrum, respectively, and the pixels comprise:

at least one first display subpixel of a first spectral characteristic, and at least one second display subpixel of a second spectral characteristic, which is different from the first spectral characteristic; and/or the pixels comprise at least one first display subpixel having an emission spectrum and an absorption spectrum with zero spectral shift.

8. The display according to claim 7, wherein the pixels comprise at least three micro light-emitting diodes, a first micro light-emitting diode of the first spectral characteristic configured as a first display subpixel, a second micro light-emitting diode of the second spectral characteristic configured as a second display subpixel, and a third micro light-emitting diode of a third spectral characteristic configured as a first display subpixel, wherein the third spectral characteristic is different from the first and second spectral characteristics; and wherein, in reference to the second spectral characteristic:

the first spectral characteristic has a positive spectral shift, and the third spectral characteristic has a negative spectral shift.

9. The display according to claim 1, wherein the first and second mode of operation alternate, such that the first display subpixels alternate to operate as emitters or detectors of light, and/or the first display subpixels comprise at least a first and a second subset, such that, during the second mode of operation, display subpixels from the first and the second subset alternate to operate as emitters or detectors of light.

10. The display according to claim 1, wherein the transceiver circuit is arranged to receive and output sensor signals generated by display subpixels in the second mode of operation.

11. The display according to claim 1, wherein at least one resonant-cavity light emitting device comprises a high Q resonator arranged for additional absorption in an absorption band of the micro light-emitting diodes.

12. The display according to claim 1, wherein the resonant-cavity light emitting devices comprise at least one of:

a vertical-cavity surface-emitting laser, VCSEL, a microdisk laser, a resonant cavity light emitting diode, a distributed feedback laser, DFB.

13. A display device comprising:

a display according to claim 1, and a host system; wherein the host systems comprises one of:

a mobile device, such as a mobile phone, smart phone, smart watch, artificial reality or virtual reality enabled device, consumer electronics, such as a laptop, a tablet, an earbud, an Advanced Driver Assistance System, ADAS, a medical device, and/or a human interface device.

14. The micro-LED display device of claim 13, wherein the display, in the second mode of operation, is operable as:

an ambient light sensor, a proximity sensor, a distance sensor, a fingerprint sensor, and/or a gesture sensor.

15. The display according to claim 1, wherein the display comprises a plurality of second display subpixels that are configured to illuminate an object positioned a distance away from the display, and wherein the first display subpixels are configured to detect the light that is reflected back from the object.

16. The display according to claim 1, wherein the display further comprises a plurality of second display subpixels including a green micro light-emitting diode, and wherein the green micro light-emitting diode receives a same polarity bias in the first and second modes of operation such that the green micro light-emitting diode emits light in the green band.

17. The display according to claim 1, wherein two of the first display subpixels comprise a first resonant-cavity light emitting device and a second resonant-cavity light emitting device, wherein the first and second resonant-cavity light emitting devices receive a bias of alternating polarity according to the first and second modes of operation and thus are operable to emit light and to detect light, and wherein the first and second modes of operation, and consequently a timing of emitting and detecting, are shifted such that the first resonant-cavity light emitting device emits light simultaneously with the second resonant-cavity light emitting device detecting light, and vice versa, and as a result, the first and second modes of operation are defined on a per-pixel basis.

18. The display according to claim 1, wherein at least one of the first display subpixels comprises the resonant-cavity light emitting device including an active quantum wall region positioned between two dielectric Bragg reflector mirrors, and wherein the Bragg reflector mirrors comprise quarter wave stacks made of alternating high and low refractive index layers.

19. A method to operate a display, wherein the display comprises:

a display substrate having an active display area comprising a plurality of first display subpixels, wherein the first display subpixels comprise micro light-emitting diodes and/or resonant-cavity light emitting devices, and wherein the first display subpixels comprise:

a red display subpixel that emits in a red band and detects in a green band and a blue band:

a blue display subpixel that emits in the blue band and detects in the red band and the green band; and a green display subpixel that emits in the green band and detects in the red band and the blue band, and a transceiver circuit arranged to drive the display in a first mode of operation or in a second mode of operation;

the method comprising the steps of:

in the first mode of operation, providing a forward bias to the first display subpixels by means of the transceiver circuit and operating the first display subpixels to emit light, and in the second mode of operation, providing a reverse bias to the first display subpixels by means of the transceiver circuit and operating the first display subpixels to detect light.

* * * * *